United States Patent
Lum

(10) Patent No.: US 9,644,335 B1
(45) Date of Patent: May 9, 2017

(54) METHOD AND APPARATUS FOR MECHANICAL RECOVERY OF HYDROCARBONS IN BROKEN OCEAN ICE CONDITIONS

(71) Applicant: Daniel J. Lum, Fairbanks, AK (US)

(72) Inventor: Daniel J. Lum, Fairbanks, AK (US)

(*) Notice: Subject to any disclaimer, the term of this patent is extended or adjusted under 35 U.S.C. 154(b) by 84 days.

(21) Appl. No.: 14/645,652

(22) Filed: Mar. 12, 2015

(51) Int. Cl.
*E02B 15/04* (2006.01)
*E02B 15/10* (2006.01)
*C02F 1/40* (2006.01)
*B63B 35/32* (2006.01)
*C02F 101/32* (2006.01)
*C02F 103/00* (2006.01)

(52) U.S. Cl.
CPC ............ *E02B 15/106* (2013.01); *B63B 35/32* (2013.01); *C02F 1/40* (2013.01); *E02B 15/046* (2013.01); *E02B 15/048* (2013.01); *C02F 2101/32* (2013.01); *C02F 2103/007* (2013.01); *C02F 2201/002* (2013.01)

(58) Field of Classification Search
CPC ..... E03F 15/046; E03F 15/048; E03F 15/106; B63B 35/32; C02F 2103/007; E02B 15/046; E02B 15/048; E02B 15/106
USPC ............ 210/747.5, 747.6, 776, 122, 170.05, 210/170.11, 242.3, 923
See application file for complete search history.

(56) References Cited

U.S. PATENT DOCUMENTS

| | | | | |
|---|---|---|---|---|
| 3,788,481 A * | 1/1974 | DEAngelis | ........... | E02B 15/046 210/242.3 |
| 4,182,679 A * | 1/1980 | Van Hekle | ............ | E02B 15/048 210/242.3 |
| 4,892,666 A * | 1/1990 | Paulson | ................ | E02B 15/106 210/242.3 |
| 5,169,526 A * | 12/1992 | Gould | ..................... | E02B 15/06 210/242.3 |
| 5,472,597 A * | 12/1995 | Carro | .................... | E02B 15/106 210/242.3 |
| 5,693,218 A * | 12/1997 | Yamamoto | ............ | E02B 15/106 210/242.3 |
| 5,820,751 A * | 10/1998 | Faircloth, Jr. | ...... | B01D 21/2444 210/122 |
| 6,663,772 B2 * | 12/2003 | Rosquist | ................. | E02B 15/06 210/242.3 |
| 7,182,860 B2 * | 2/2007 | Lundin | ................. | E02B 15/106 210/242.3 |

* cited by examiner

*Primary Examiner* — Christopher Upton
(74) *Attorney, Agent, or Firm* — Michael J. Tavella

(57) ABSTRACT

A system for collecting oil from mixed ice and water conditions. The system uses suction pods that are welded along the hull of a vessel. These pods are elongated vertically and have a vertical slit opening that allow oiled water to enter into the suction box during wave action. Each vertical opening is covered with stainless steel mesh layers to inhibit smaller ice from entering the suction box. Inside each of the suction boxes is a horizontal floating suction bar that is connected to a flexible suction hose. The suction bar is free floating within the suction box so that collection always occurs at the water's surface. The collection line from the suction box leads to a collection and separation area. The suction boxes are protected by heavy-duty metallic "bumper that are welded to the hull to protect the suction box arrays.

17 Claims, 3 Drawing Sheets

METHOD AND APPARATUS FOR MECHANICAL RECOVERY OF HYDROCARBONS IN BROKEN OCEAN ICE CONDITIONS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to hydrocarbon recovery systems and particularly to hydrocarbon recovery systems for use in broken ice conditions.

2. Description of the Prior Art

Current mechanical response technology for oil spill response, when used in icy and rough ocean conditions is ineffective. Booms and skimmers simply do not function in common Arctic and Antarctic ice conditions. Small ice floes can perforate even the strongest boom materials, and skimmers require calm conditions to perform with very low actual recovery.

Changing ocean ice and steadfast ice conditions now create unpredictable ice flow movement as multiyear ice packs to thin. Evolving polar climates create ice conditions that behave increasingly erratic, complicating oil spill response recovery even further.

At present, most devices for dealing with oil spills on ice deal with oil on the surface or within a floe or block of ice, rather than conditions where oil in liquid water that is mixed with ice. Some examples of these devices are found in the following U.S. Pat. No. 6,592,765, which teaches a device that forces ice blocks under the water to cause the oil to float off the ice using vibration. U.S. Pat. No. 8,343,358, uses a three-hulled vessel to push ice blocks under the vessel where scrapers shave off the top layers of oil-containing ice. U.S. Pat. No. 7,112,279 uses a different approach. Here, a vessel has an opening in the side that collects oil, water and ice. Once in the vessel, the oil is separated and contained. Another alternative is found in U.S. Pat. No. 4,053,406, which discloses a vessel that picks up whole blocks of surface ice, cleans them and the returns them to the water. U.S. Pat. No. 4,039,454 teaches a device jars ice pieces while at the same time propels them back away from the oil pickup section. The ice chunks are then upwardly propelled along the inclined surface of a perforated inclined through-put barrier, which allows oil jarred from the ice to rise through the barrier and toward the surface of the water. The oil is contained and, in fact, "built up" in thickness above the through put barrier as a result of its being contained between the side support members of the structure supporting the pick-up device, the 'pick-up device itself, and a rear "back stop". U.S. Pat. No. 7,182,860 teaches a device that has a frame that is positioned on the surface of an ice/water mixture. Air is removed to cause the water level to rise within the frame. A disintegrator rotates within the frame to emulsify the oil so that it can be removed from the housing to a treatment vessel.

From the descriptions above, it is clear that these devices either work by picking up whole blocks of ice for cleaning, or by working the surface of the ice to remove oil. None of these devices works well in dealing with broken ice conditions where ice is not solidly packed into convenient blocks.

BRIEF DESCRIPTION OF THE INVENTION

The instant invention overcomes these difficulties because it is used in conditions were the ice has not formed into solid blocks. Moreover, mechanical spill response equipment in broken ice conditions must be tough. Booms are weak in icy waters. Skimmers function in calm waters (in lake environments) but cannot withstand extended exposure to broken ice abuse, much less function in rough seas with broken ice. Any polar spill response equipment must essentially be armored against the ice.

The concept of the instant invention is to use the perimeter of the vessel itself as the point of collection/separation. Existing vessels and barges could be retrofitted with such bumper technology for a fraction of the price of building new vessels.

The system is made up of a number of components. The first of these are suction pods or elongated suction boxes that are welded along the hull of a barge or a vessel. These pods are designed in elongated, rounded, oval or linear fashion depending on the ice conditions. They are elongated vertically and have a slit opening, running vertically, along the middle of the suction boxes. The vertical openings allow oiled water to enter into the suction box during wave action. This vertical opening is covered with stainless steel mesh layers to inhibit smaller ice from entering the suction box. Each suction box mesh section has independent heating elements to prevent clogging during slush ice conditions.

Inside each of the suction boxes is a horizontal floating suction bar that is connected to a high grade, expandable/contractible flexible suction hose. The suction bar is free floating within the suction box so that collection always occurs at the water's surface. The collection line from the suction box leads upwards and connects to a "main line," which leads to a collection and separation area.

The suction boxes are stacked side by side and are protected by heavy duty metallic "bumpers", e.g., steel tubing and/or other barriers that are welded to the hull to protect the suction box arrays.

The bumper recovery system can withstand the rigors of broken ice and high wave conditions. The floating suction bar operates at water level for recovery at the ocean surface, and the pods that contain the floating suction bars, are protected by the bumpers welded to the ship or barge hull. In this way, a system is provided to collect oil from mixed ice and water conditions efficiently and with the requisite strength to stand up to the rigors of the environmental conditions for long periods with minimum damage.

DETAILED DESCRIPTION OF THE INVENTION

Figure 1:
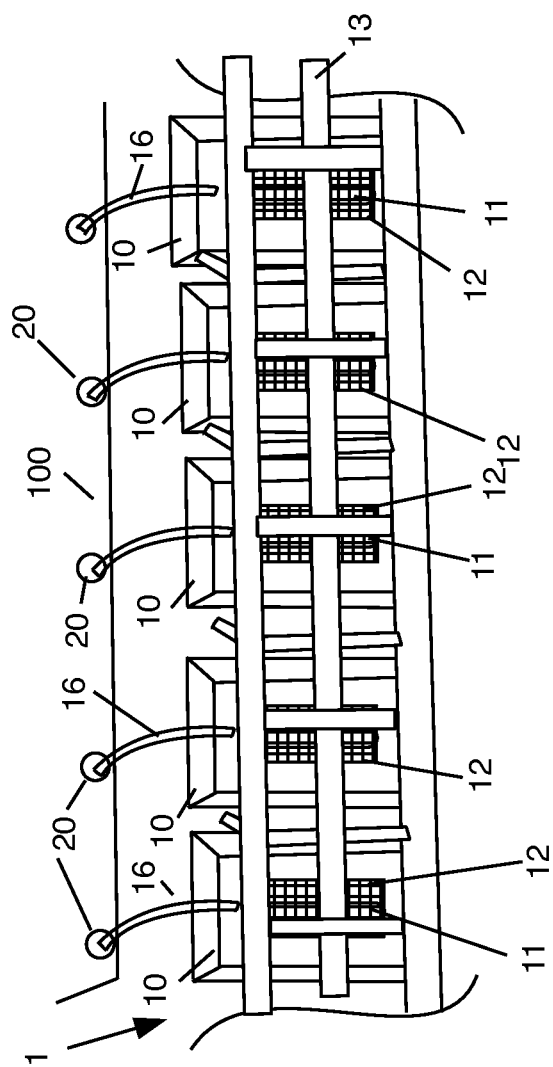
FIG. 1 is a side view of the invention assembled on the side of a vessel.

Referring now to FIG. 1, a side view of the invention 1 assembled on the side of a vessel 100. As shown in FIG. 1, a plurality of suction pods or elongated suction boxes 10, which are welded along the hull of a barge or a vessel 100, are shown. Note that the pods can also be non-permanently attached, if desired. These pods 10 are designed in elongated, rounded, oval or linear fashion depending on the ice conditions (Here they are shown in a box-like structure. The pods are vertically disposed and have a slit opening 11 (see FIG. 2), running vertically, along the middle of the pods 10. The vertical openings allow oiled water to enter into the pods during wave action. Each vertical opening 11 is covered with stainless steel mesh layers 12 (see FIG. 2) to inhibit smaller ice pieces from entering the pods 10.

The pods are arranged side by side and are protected by heavy-duty metallic "bumpers" 13, e.g., steel tubing and/or similar barriers that are welded to the hull 100 to protect the pod array. As shown, the bumpers have two horizontal members and several vertical members making a "fence" in front of the pod array.

Figure 2:
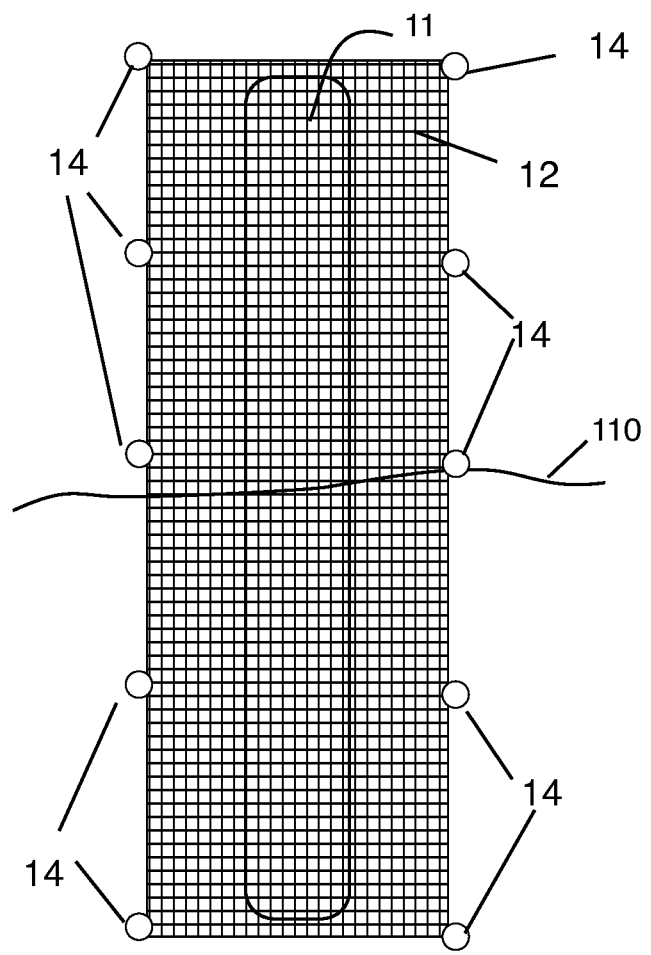
FIG. 2 is a detail of the intake port and protective screen for the suction boxes.

FIG. 2 is a detail of the intake port and protective screen for the suction boxes. Here the opening 11 is shown behind a mesh screen 12. Each pod mesh section has independent heating elements 14 to prevent clogging during slush ice conditions. As noted above, the vertical opening allows water and oil to enter the pod with normal wave action. The large size of the opening also ensures the water and oil will enter the pods regardless of the level of the hull in the water. Thus, an empty ship or barge sits higher in the water so the lower portion of the pod opening 11 will be submerged, as shown in the figure. Note the water line 110 shown about the center of the opening 11. As the vessel or barge fills with oil, the vessel sits lower in the water and more of the pod opening will be submerged. Once inside the pod, the oil is removed using a horizontal suction bar and expandable hose, as shown in FIG. 3.

Figure 3:
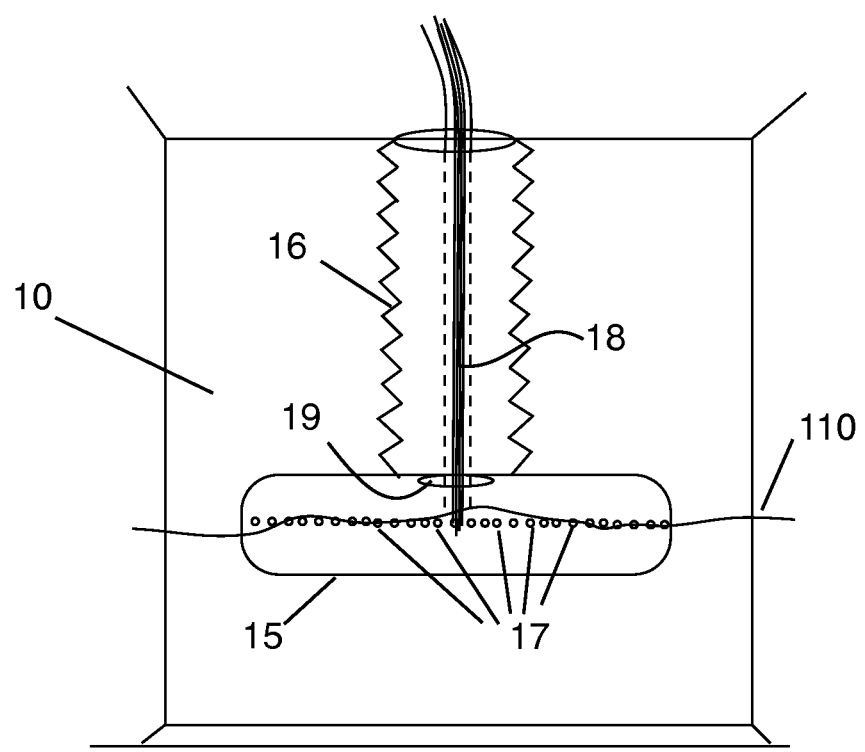
FIG. 3 is a detail view of the horizontal suction bar and expandable hose.

FIG. 3 is a detail view of the horizontal suction bar 15 and expandable hose 16 that is placed inside each of the pods. The horizontal floating suction bar 15 is free floating within the suction box so that collection always occurs at the water's surface. Note again, the water line 110. A number of holes 17 are formed in the side of each horizontal suction bar 15 to collect the oil from the water. The horizontal suction bar 15 has the high grade, expandable/contractible flexible suction hose 16 attached that provides a suction to remove oil/water 18 from the horizontal floating suction bar 15. The suction hose 16 extends from inside the horizontal suction bar 15 (through hole 19 in the horizontal suction bar) and leads upwards to the vessel, where it feeds into a "main line," (not shown). The main line then leads to a collection and separation area (also not shown) located either in the vessel or on shore. The oil 18 is shown being removed from within the high grade, expandable/contractible flexible suction hose 16 that attaches to the horizontal floating suction bar 15 and extends upwards out of the pod to a port 20 within the side of the hull of the vessel 100, as shown in FIG. 1.

In this way, oil can be continuously pulled from the water under icy conditions with a minimum of difficulty and a maximum of efficiency.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:
1. An apparatus for mechanical recovery of hydrocarbons in broken ocean ice conditions comprising:
   a) at least one suction pod, having an outer wall and a hollow interior, fixedly attached to an exterior surface of a hull of a vessel such that it remains in one position on said vessel, said at least one suction pod having an opening formed in said outer wall;
   b) a horizontal floating suction bar, installed within said suction pod, said horizontal floating suction bar having at least one input opening and one output opening formed therein; and
   c) an expandable suction hose, attached to the output opening of said horizontal floating suction bar.

2. The apparatus of claim 1 wherein the at least one suction pod has a shape selected from the group of elongated, rounded, oval and linear.

3. The apparatus of claim 1 wherein the opening formed in said outer wall is a slit opening, running vertically in said outer wall.

4. The apparatus of claim 3 wherein the opening is covered with stainless steel mesh screen.

5. The apparatus of claim 4 further comprising at least one heating element attached to said mesh screen.

6. The apparatus of claim 1 wherein the expandable suction hose has an outlet end and further wherein the outlet end connects to the vessel.

7. The apparatus of claim 1 wherein a heavy-duty metallic bumper is fixedly attached to the exterior of said hull over the outer wall of said at least one suction pod to protect the at least one suction pod.

8. The apparatus of claim 1 wherein said horizontal floating suction bar further comprises a plurality of input opening formed therein.

9. An apparatus for mechanical recovery of hydrocarbons in broken ocean ice conditions comprising:
   a) a plurality of suction pods, each having an outer wall and a hollow interior, each of said plurality of suction pods being fixedly attached to the exterior of a hull of a vessel such that each of said plurality of suction pods remains in one position on said vessel, each of said plurality of suction pods also having an opening formed in said outer wall;
   b) a horizontal floating suction bar, installed within each of said plurality of suction pods, each of said horizontal floating suction bars having at least one input opening and one output opening formed therein; and
   c) an expandable suction hose, attached to the output opening of each of said horizontal floating suction bars.

10. The apparatus of claim 9 wherein each of said plurality of suction pods has a shape selected from the group of elongated, rounded, oval and linear.

11. The apparatus of claim 9 wherein the opening formed in said outer wall of each of said plurality of suction pods is a slit opening, running vertically in said outer wall.

12. The apparatus of claim 11 wherein the slit opening formed in each of said plurality of suction pods is covered with stainless steel mesh screen.

13. The apparatus of claim 12 further comprising at least one heating element attached to each of said mesh screens.

14. The apparatus of claim 9 wherein each expandable suction hose has an outlet end and further wherein the outlet end connects to a main line, which leads to a collection and separation area.

15. The apparatus of claim 9 wherein a heavy-duty metallic bumper is fixedly attached to the exterior of said hull over the outer wall of each of said plurality of suction pods to protect the plurality of suction pods.

16. The apparatus of claim 9 wherein each horizontal floating suction bar further comprises a plurality of input opening formed therein.

17. A method of mechanical recovery of hydrocarbons in broken ocean ice conditions comprising the steps of:
   a) fixedly attaching a plurality of suction pods to the exterior of a hull of a vessel, such that each of said plurality of suction pods remains in one position on said vessel, each of said plurality of suction pods having an outer wall and a hollow interior, and also having an opening formed in said outer wall and further wherein each of said plurality of suction pods has a horizontal floating suction bar installed within, and further wherein each of said horizontal floating suction bars having at least one input opening and one output opening formed therein; and further wherein an expandable suction hose, is attached to the output opening of each of said horizontal floating suction bars;
   b) placing said vessel in a location having a mix of ice and oily water, such that the oily water enters each of said plurality of suction pods, thereby causing each of said horizontal floating suction bars to float on said oily water;
   c) causing said oily water to enter said horizontal floating suction bars;
   d) transferring said oily water from said horizontal floating suction bars through said expandable suction hoses, into a storage vessel; and
   e) repeating steps a-e until said oily water is removed from the location.

* * * * *